April 25, 1939.  W. F. HEROLD  2,155,827
CASTER
Filed March 22, 1937　　2 Sheets-Sheet 1
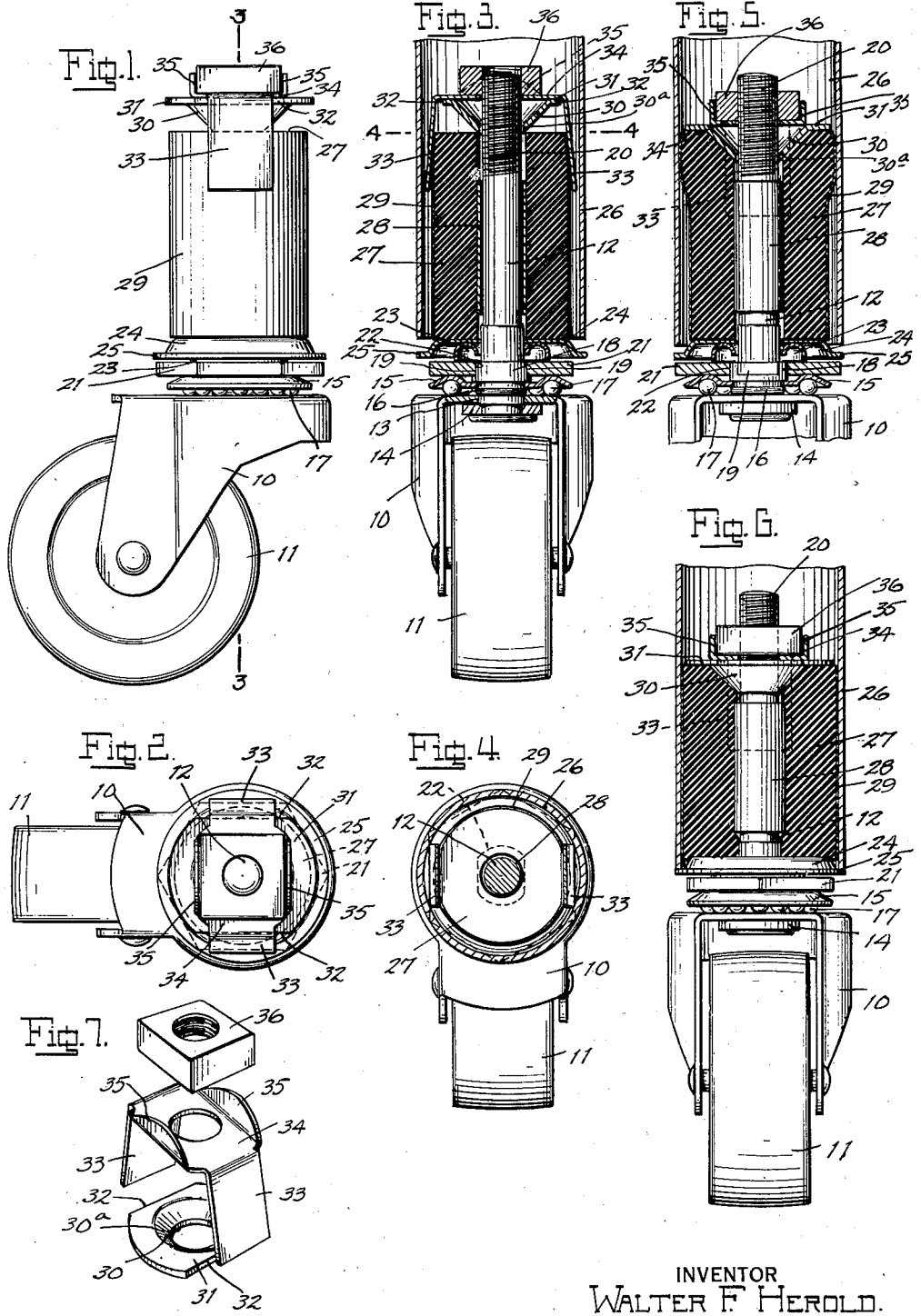
INVENTOR
WALTER F. HEROLD.
BY
ATTORNEY

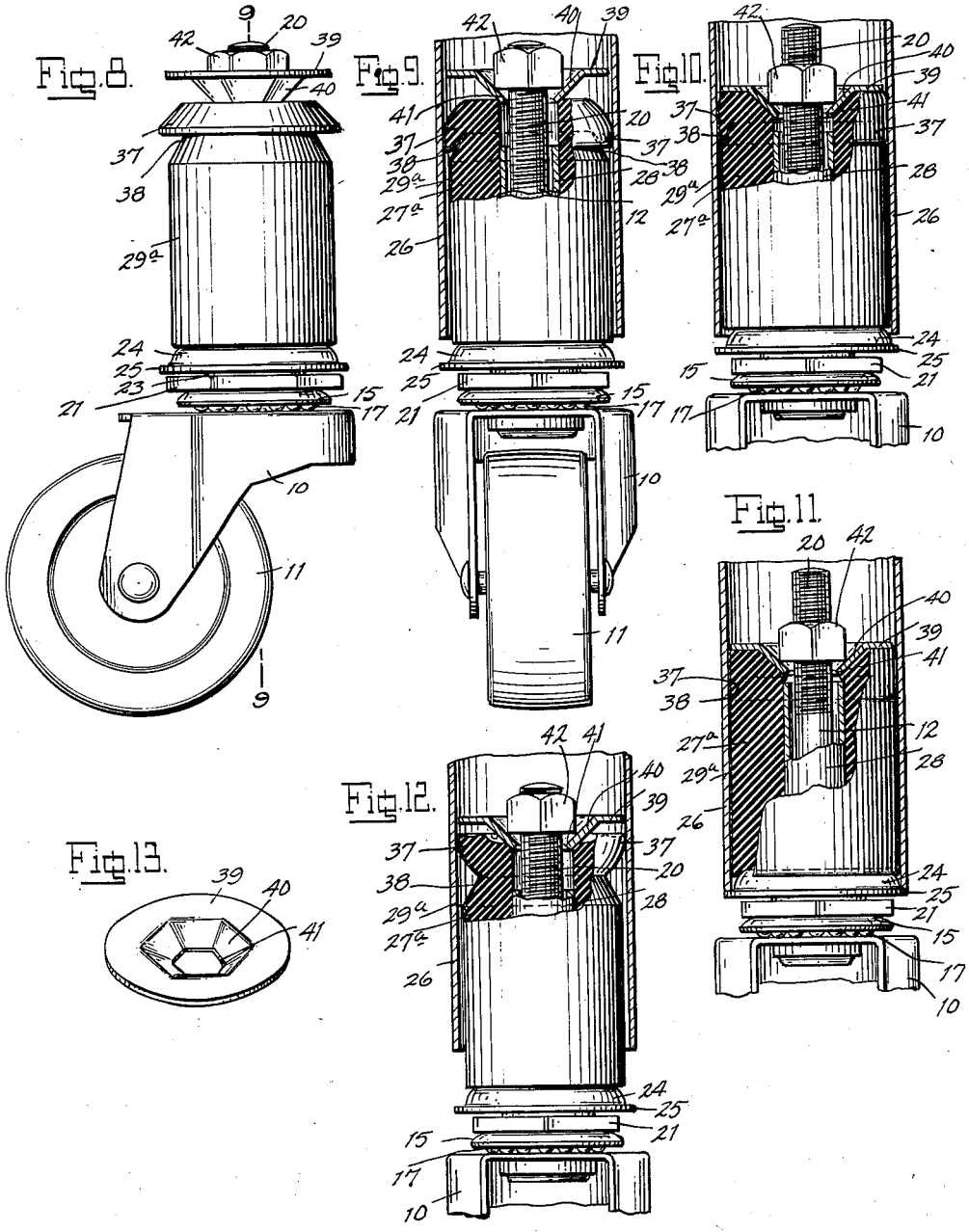

Patented Apr. 25, 1939

2,155,827

UNITED STATES PATENT OFFICE 2,155,827

CASTER

Walter F. Herold, Bridgeport, Conn., assignor to The Bassick Company, Bridgeport, Conn., a corporation of Connecticut Application March 22, 1937, Serial No. 132,426

4 Claims. (Cl. 16—38)

The present invention relates to improvements in casters, and is a continuation in part of the invention disclosed in my patent application for Casters, Serial No. 97,904, filed August 26, 1936. The invention relates particularly to a caster for attachment to tubular legs, and has for an object to provide expanding attachment means for insertion in the leg in which the expanding element consists of a rubber member which both retains the caster in relation to the leg and provides shock absorbing means for preventing transmission of shock to the furniture leg.

In casters of this type heretofore in use considerable difficulty has been experienced in causing the rubber member to initially grip the interior of the leg, so that the rotatable parts for compressing and expanding the rubber element would be operated without rotation of the rubber element, and also there was no assurance that the bottom of the attaching means would be pulled into tight engagement with the lower end of the leg, due to the fact that while the rubber element was caused to expand in a lateral direction this expansion took place simultaneously along the entire length of rubber element, with the result that the rubber would grip the leg without pulling in the lower end of the attaching means.

It is an object of the present invention to provide an expanding element which may be easily inserted in the tubular leg, and further to provide gripping means arranged to frictionally grip the interior of the leg to hold the expanding element against turning so that the rotatable parts may be effectually rotated with respect thereto. It is further proposed to provide means whereby the rubber expanding element will first be expanded into gripping engagement with the interior of the leg contiguous to its upper end so that this upper end portion of the rubber element will firmly grip the interior of the leg and act as an anchor, so that as the lower portion of the rubber is expanded into gripping engagement with the interior of the leg the lower end of the attaching means and the caster will be drawn upwardly into tight engagement with the lower end of the leg.

A further object is to provide improved bearing means between the rubber element and the rotatable means so that the latter will rotate with comparative ease when the rubber is under pressure.

A further object is to provide spacing means between the rotatable stem and the rubber sleeve whereby the latter will not grip the surface of the stem as the rubber sleeve is expanded, so that all expansion takes place in an outward direction to grip the leg thereby obtaining the maximum gripping effect with the least amount of compression of the rubber. At the same time turning of the stem is not impeded by gripping contact of the rubber therewith.

A still further object is to provide a rubber element having a flexible metallic sheathing or covering at its outer surface, so that it will easily slide with respect to the leg during insertion and removal, will permit the rubber to flow along the interior of the leg as it is expanded, and will provide a protective spacer between the rubber and the inner surface of the leg, preventing corrosive action between them. Such corrosive action usually results in deterioration of the rubber and a chemical re-action between the rubber and the metal leg, which causes the rubber to adhere to the leg. To this end the rubber sleeve is covered at its outer side with a metallic coating, which is preferably aluminum paint sprayed on the rubber, and which when dry combines with the rubber to provide a homogeneously connected metallic sheathing, which while providing the protective and sliding characteristics of metal is at the same time entirely flexible.

Another object is to provide a caster of extremely simple construction, and which may be operated with comparative ease to both engage and disengage the same with respect to the leg.

With the above and other objects in view an embodiment of the invention is shown in the accompanying drawings, and this embodiment will be hereinafter more fully described with reference thereto and the invention will be finally pointed out in the claims.

In the drawings:

Fig. 1 is a side elevation of a caster according to an exemplary illustrated embodiment of the invention.

Fig. 2 is a top plan view thereof.

Fig. 3 is a vertical sectional view taken along the line 3—3 of Fig. 1 and showing the caster inserted in the furniture leg.

Fig. 4 is a horizontal sectional view taken along the line 4—4 of Fig. 3.

Fig. 5 is a vertical sectional view, with certain of the parts shown in elevation, and with the leg turned 90° from the position shown in Fig. 3, and showing the rubber sleeve initially expanded contiguous to its upper end.

Fig. 6 is a similar view showing the rubber sleeve completely expanded with the caster in its secured relation to the tubular leg.

Fig. 7 is a perspective view of certain parts of the structure, namely, the nut, spring gripping member, and expander, in separated relation.

Fig. 8 is a side elevation of a caster according to a modified embodiment of the invention.

Fig. 9 is a vertical sectional view, with certain of the parts shown in elevation, taken along the line 9—9 of Fig. 8 and showing the caster inserted in the furniture leg.

Fig. 10 is a vertical sectional view showing the rubber sleeve member initially expanded contiguous to its upper end.

Fig. 11 is a vertical sectional view showing the rubber sleeve member expanded with the caster in its secured relation to the tubular leg.

Fig. 12 is a vertical sectional view showing the caster during the operation of removing it from the tubular leg.

Fig. 13 is a perspective view of the expander member employed.

Similar reference characters indicate corresponding parts throughout the several figures of the drawings.

Referring to the drawings and more particularly to Figs. 1 to 7 thereof, the caster according to the exemplary illustrated embodiment of the invention comprises a caster horn 10, carrying a caster wheel 11, the horn being rotatably mounted upon a vertically disposed stem 12 extending through a central aperture 13 in the horn top and retained by means of a riveted washer 14, an annularly grooved circular bearing plate 15 being secured upon the lower end of the stem by swedging, as at 16, between which plate and the horn top there are provided ball bearings 17.

The stem is provided near its lower end above the bearing plate 15 with an enlarged diameter portion 18 having oppositely disposed flats 19—19 thereon, and is provided at its upper end with a threaded portion 20. Upon the portion 18 there is mounted a hexagonal nut 21, having a non-circular aperture 22 corresponding in shape to the cross-section of the stem at the oppositely disposed flats 19—19, so that the nut is fixed with relation to the stem.

Above the nut 21 there is engaged upon the stem 12 a spacing washer 23 of curled cross-section, the inwardly and downwardly curled portion constituting the inner periphery and being out of contact with the nut 21, while the lower edge of the outer periphery is in contact with said nut. Upon this spacing washer there is engaged a leg mount plate 24, rotatably engaged upon the stem, and provided at its outer marginal portion with an outwardly and downwardly extending flange 25 adapted to engage below the lower end of the tubular leg 26. This base plate is adapted to be frictionally engaged by the lower end of the rubber expansion sleeve, presently to be more fully referred to, the circular contact support provided by the washer 23 reducing the frictional resistance to turning between the nut 21 and the leg mount plate 24, this being of importance in the securing and releasing of the caster, as will hereinafter more fully appear.

The rubber expansion sleeve 27 is of tubular cylindrical form, and is engaged upon the stem 12 with its base resting upon the leg mount plate 24. The bore of the sleeve is slightly larger than the diameter of the stem 12, and has engaged therein a rigid metal tube 28 which is rotatably engaged by the stem 12, this tube acting as a spacer between the stem and the sleeve so that the latter will not expand into engagement with the stem and thereby create frictional resistance to turning.

The rubber sleeve is provided with a metallic sheathing or coating 29, preferably of aluminum paint, which is sprayed or otherwise applied to the outer surface. This coating allows the surface of the rubber sleeve to slide during its expansion with respect to the inner surface of the tubular leg, and when expanded provides a protective layer between the rubber and the metal of the leg, so that the rubber will be protected against deterioration, such as occurs when rubber is held under pressure in direct contact with metal. This deterioration is usually due to corrosion caused by chemical re-action between the ingredients of the rubber and the metal, and this is effectually prevented by the present arrangement.

Upon the upper threaded end 20 of the stem there is engaged a conical expander 30 normally disposed above the upper end of the rubber sleeve in the detached position of the caster as shown in Fig. 1, and having its lower edge sharply pointed, as at 30$^a$, by the intersection of the conical surface with the cylindrically bored aperture engaged by the stem, this sharpened edge being engaged with the edge of the bore of the sleeve so that upon downward movement of the expander it will easily enter this bore.

The horizontally extending flange 31 of the expander is provided at two opposite sides with straight edges 32, which are engaged by the downwardly bent legs 33—33 of an inverted U-shape spring gripping member 34 engaged upon the stem, the spring legs extending downwardly at the sides of the upper portion of the sleeve 27, compressing the rubber so that the latter forces the spring legs outwardly against the tubular leg. The opposite edges of the top of the spring member between the legs are bent upwardly to provide nut retaining flanges 35—35, the nut 36 engaged with the threaded end 20 of the stem being seated upon the spring member between the flanges 35—35, so that it is held against relative movement with respect to the spring member.

The spring member is for the purpose of preventing turning of the nut when the socket is first inserted in the leg in its non-expanded condition, the spring legs being such that their lower corners and vertical edges frictionally engage the inner surface of the leg with sufficient biting action to prevent relative turning of the spring member and the nut as the stem is rotated by means of the lower hexagonal nut 21.

The operation is as follows:

As shown in Figs. 3 and 4 the socket is inserted in the tubular leg with the spring legs 33 frictionally engaging the inner surface so that the spring member and nut are held against rotation, and the stem 12 may be rotated by turning the nut 21 by means of a suitable wrench. As shown in Fig. 5 the stem has been rotated to a point where the conical expander has been pressed downwardly into the upper end of the sleeve 27, causing the upper end portion to be forced or displaced outwardly into frictional contact with the inner surface of the leg, the horizontal flange portion 31 being in engagement with the upper end of the sleeve. The upper end of the sleeve is thus anchored, so that the further turning of the stem will cause the lower end of the caster to be drawn up into tight engagement with the lower end of the furniture leg as the sleeve is further expanded by continued rotation of the stem 12. Fig. 6 shows the rubber sleeve expanded along its entire length and the base leg mount plate 25 drawn upwardly into tight engagement with the lower end of the tubular sleeve 26.

In Figs. 8 to 13 I have illustrated a modification, in which the spring gripping means, for holding the rubber member, together with the expender and nut, against rotation upon initial insertion, consists of a rubber flange portion 37 integrally formed at the upper end of the rubber expansion sleeve 27a, the peripheral surface of this flange portion being downwardly and outwardly inclined and its diameter at its lower edge being larger than the interior diameter of the tubular leg 26. Directly below the flange the outer surface of the cylindrical sleeve 27a is inclined upwardly and inwardly, as at 38, to form a recess into which the flange may move when it is inserted in the tubular leg and downwardly deformed.

The expander member consists of a circular washer 39 having its central portion formed into a downwardly and inwardly inclined wall 40 having a central aperture 41 for engagement of the threaded shaft 12, this portion 40 being provided with six facets, so that it has a substantially truncated inverted pyramidal shape, the upper surface thereby constituting a socket for receiving the hexagonal nut 42 so that the latter is held against rotation with respect to the washer, and the lower surface constituting a wedge-like expander surface for entering the upper end of the rubber sleeve member 27a. As in the first embodiment the rubber sleeve member is provided with a metallic sheathing or coating 29a of aluminum paint or the like.

The operation is as follows:

As shown in Fig. 8 the flange 37 in the normal detached relation of the caster has its upper inclined surface projecting outwardly with respect to the outline of the washer 39, so that upon insertion in the leg the inclined surface of the flange will provide an entering guide into the leg. As the diameter of the flange 37 at its lower end is greater than the interior diameter of the leg the flange will be deformed downwardly into the recesses 38 as the caster is pushed into the leg, assuming the shape as shown in Fig. 9. In this relation it grips the interior of the leg with sufficient frictional force to securely hold the rubber sleeve, the expander washer 39, and the nut 42 against rotation with respect to the leg, so that the nut 21 and the shaft 12 carried thereby may be rotated to expand the rubber sleeve. The initial rotation causes the expander washer to have its lower pyramidal surface drawn into the upper end of the bore of the rubber sleeve causing the upper portion of the sleeve to be outwardly deformed and compressed so that it tightly grips the interior of the leg and thereby forms an anchor. This condition is shown in Fig. 10.

The further compression of the sleeve through continuous rotation of the nut 21 and shaft 12 thereupon expands the sleeve into engagement with the interior of the leg along the full length of the sleeve, and at the same time the flange 25 of the leg mount plate 24 is drawn upwardly into tight engagement with the lower end of the tubular leg 26, as shown in Fig. 11.

In order to remove the caster the nut 21 and shaft 12 are turned in disengaging direction with respect to the nut 42 to a point where the expander member 39 is raised with respect to the upper end of the rubber sleeve to provide a space between the upper end of the flange 37 and the expander member sufficient to permit the flange 37 to flex upwardly therein. Thereupon the caster is pulled downwardly causing the flange 37 to take a reverse position to that shown in Fig. 9, moving upwardly into the space below the washer 39, as shown in Fig. 12, so that the caster may be readily removed.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:

1. In a furniture support for insertion in a tubular leg, a floor engaging element, a vertical stem connected thereto, an expansion sleeve surrounding said stem, said stem being rotatable with respect to said expansion sleeve and having a threaded upper end projecting above said sleeve, a nut on said threaded upper end adapted to be axially moved through rotation of said stem, a gripping member engaged upon said stem beneath said nut and non-rotatably connected to said nut, said gripping member adapted to engage the inner surface of said leg and to be held against rotation thereby, whereby said nut is held against rotation.

2. In a furniture support for insertion in a tubular leg, a floor engaging element, a vertical stem connected thereto, an expansion sleeve surrounding said stem, said stem being rotatable with respect to said expansion sleeve and having a threaded upper end projecting above said sleeve, a nut on said threaded upper end adapted to be axially moved through rotation of said stem, a gripping member engaged upon said stem beneath said nut and non-rotatably connected to said nut, said gripping member adapted to engage the inner surface of said leg and to be held against rotation thereby, whereby said nut is held against rotation, said gripping member being of inverted U-shape and having downwardly extending spring legs disposed at the sides of said expansion sleeve.

3. In a furniture support for insertion in a tubular leg, a floor engaging element, a vertical stem connected thereto, an expansion sleeve surrounding said stem, means on said stem for axially compressing said sleeve whereby said sleeve is laterally expanded, a nut secured to the lower end portion of said stem below said sleeve for rotating said stem, a leg mount plate below the lower end of said sleeve and bearing means between said nut and said leg mount plate having circular line contact with one of them.

4. In a furniture support for insertion in a tubular leg, a floor engaging element, a vertical stem connected thereto, an expansion sleeve surrounding said stem, said stem having a threaded upper end projecting above said sleeve, a nut non-rotatably secured to said stem below said sleeve, threaded expander means on said threaded upper end of said stem adapted to be axially moved through rotation of said stem, said expander means having a wedge surface adapted to enter the bore of said sleeve to initially laterally displace the upper end portion of said sleeve, and said expander means having an annular flat surface surrounding said wedge surface adapted to engage the upper end of said sleeve whereby continued downward movement of said expander means is adapted to expand said sleeve between its ends.

WALTER F. HEROLD.